(12) United States Patent
Ran et al.

(10) Patent No.: US 6,864,904 B1
(45) Date of Patent: Mar. 8, 2005

(54) FRAMEWORK FOR PROVIDING VISUAL CONTEXT TO WWW HYPERLINKS

(75) Inventors: Shirli Ran, Savion (IL); Eldad Barnoon, Tel Aviv (IL); Yuval Yarom, Ra'anana (IL)

(73) Assignee: Girafa.com Inc., Wilmington, DE (US)

( * ) Notice: Subject to any disclaimer, the term of this patent is extended or adjusted under 35 U.S.C. 154(b) by 224 days.

(21) Appl. No.: 09/708,191

(22) Filed: Nov. 8, 2000

Related U.S. Application Data

(60) Provisional application No. 60/169,328, filed on Dec. 6, 1999.

(51) Int. Cl.[7] ................................................ G09G 5/00
(52) U.S. Cl. ........................ 345/760; 345/744; 345/763; 345/838
(58) Field of Search ................................ 345/744, 760, 345/763, 838; 715/501.1, 526, 513

(56) References Cited

U.S. PATENT DOCUMENTS

| | | | | |
|---|---|---|---|---|
| 5,940,075 | A | * 8/1999 | Mutschler et al. | 345/760 |
| 5,963,964 | A | * 10/1999 | Nielsen | 715/501.1 |
| 6,073,168 | A | * 6/2000 | Mighdoll et al. | 709/217 |
| 6,119,135 | A | * 9/2000 | Helfman | 715/513 |
| 6,144,962 | A | * 11/2000 | Weinberg et al. | 707/10 |
| 6,154,771 | A | 11/2000 | Rangan et al. | |
| 6,181,342 | B1 | * 1/2001 | Niblack | 345/635 |
| 6,182,097 | B1 | * 1/2001 | Hansen et al. | 715/526 |
| 6,184,886 | B1 | * 2/2001 | Bates et al. | 345/760 |
| 6,199,081 | B1 | * 3/2001 | Meyerzon et al. | 715/513 |
| 6,230,321 | B1 | 5/2001 | Kim | |
| 6,262,708 | B1 | * 7/2001 | Chu | 345/667 |
| 6,273,857 | B1 | * 8/2001 | Aden | 600/437 |
| 6,300,947 | B1 | 10/2001 | Kanevsky | |
| 6,310,601 | B1 | * 10/2001 | Moore et al. | 345/660 |
| 6,356,908 | B1 | * 3/2002 | Brown et al. | 707/10 |
| 6,369,811 | B1 | * 4/2002 | Graham et al. | 345/764 |
| 6,374,273 | B1 | 4/2002 | Webster | |
| 6,401,118 | B1 | * 6/2002 | Thomas | 709/224 |
| 6,421,070 | B1 | * 7/2002 | Ramos et al. | 345/763 |
| 6,456,307 | B1 | * 9/2002 | Bates et al. | 345/838 |
| 6,486,895 | B1 | * 11/2002 | Robertson et al. | 345/776 |
| 6,526,424 | B2 | * 2/2003 | Kanno et al. | 715/512 |
| 6,578,078 | B1 | * 6/2003 | Smith et al. | 709/224 |
| 6,613,100 | B2 | * 9/2003 | Miller | 715/526 |
| 6,665,838 | B1 | * 12/2003 | Brown et al. | 715/501.1 |

OTHER PUBLICATIONS

Andy Cockburn, et al, "Issues of page representation and organization in web browser's revisitation tools", proceedings of the OZCHI'99 Australian Conf. of Human Computer Interaction, Nov. 28–30, Wagga Wagga Australia.

Benjamin B. Bederson, et al, "A zooming web browser", published in 1996 in the 9th Annual ACM Simposium on user–interface software and technology.

George Robertson, et al, "Data mountain: using spatial memory for document management", published in 1998 in the 9th Annual ACM Simposium on user–interface software and technology.

Mary Czerwinski, et al, "Visualizing implicit queries for information management and retrieval", published in May 1999, in the proceedings of the ACM Conference on human factors in computing systems.

* cited by examiner

*Primary Examiner*—Matthew C. Bella
*Assistant Examiner*—Po Wei Chen
(74) *Attorney, Agent, or Firm*—Ladas & Parry

(57) ABSTRACT

A method and a system for presenting Internet information to a user including providing to a user a visual image of a web page containing at least one hyperlink, and at least partially concurrently providing a visual image of another web page of at least one web site which is represented by the at least one hyperlink.

56 Claims, 11 Drawing Sheets

FRAMEWORK FOR PROVIDING VISUAL CONTEXT TO WWW HYPERLINKS

PRIORITY CLAIM

This application claims priority from Provisional Application Ser. No. 60/169,328, filed Dec. 6, 1999.

The material on the compact discs labeled COPY 1 and COPY 2 is incorporated by reference. The compact discs are identified in the LIST OF APPENDICES below.

FIELD OF THE INVENTION

The present invention relates to Internet methodologies and systems generally and more particularly to systems and methodologies for displaying information received over the Internet.

BACKGROUND OF THE INVENTION

The following U.S. patents are believed to represent the current state of the art: U.S. Pat. Nos. 6,101,510; 6,016,494; 6,011,537; 5,973,692.

The following disclosures are also believed to be relevant to the subject matter of the present invention:

- R. J. Yarger, G. Reese, and T. King "MySQL & mSQL," O'REILLY & Associates Inc, 1999, ISBN 1-56592-434-7;
- B. Laurie, and P. Laurie "Apache the Definitive Guide, 2nd edition," O'REILLY & Associates Inc. 1999, ISBN 1-56592-528-9;
- C. Musciano, and B. Kennedy "HTML the Definitive Guide, 3rd edition," O'REILLY & Associates Inc, 1998, ISBN 1-56592-492-4;
- Libwww http://www.w3.org/Library;
- T. Berners-Lee, R. Fielding, and L. Masinter "Uniform Resource Identifiers (URI): Generic Syntax", RFC 2396, August 1998.

SUMMARY OF THE INVENTION

The present invention seeks to provide a particularly beneficial methodology and system for displaying information received over the Internet.

There is thus provided in accordance with a preferred embodiment of the present invention a method for presenting Internet information to a user. The method includes providing to a user a visual image of a web page containing at least one hyperlink, and at least partially concurrently providing a visual image of another web page of at least one web site which is represented by said at least one hyperlink.

Further in accordance with a preferred embodiment of the present invention the visual image of said another web page is displayed alongside the visual image of said web page.

Preferably the visual image of another web page appears hovering over said hyperlink.

Still further in accordance with a preferred embodiment of the present invention the visual image of said another web page is displayed within the visual image of said web page. The visual image of another web page appears hovering over said hyperlink.

Additionally in accordance with a preferred embodiment of the present invention the visual images of a plurality of other web pages represented by at least one hyperlink are displayed simultaneously along with said visual image of a web page containing at least one hyperlink.

Furthermore in accordance with a preferred embodiment of the present invention the web page comprises an HTML page.

Moreover in accordance with a preferred embodiment of the present invention, the method also includes providing a visual image of another web page includes employing a web browser including visualization functionality which interfaces via the Internet with an image server.

Preferably the visualization functionality is operative to download via the image server from an image database images of web pages which are referenced in hyperlinks contained in the web page and to provide to a user, via the web browser, an annotated web page.

Additionally or alternatively the annotated web page includes the web page having alongside it images of homepages linked with the web page.

Further in accordance with a preferred embodiment of the present invention, the method includes providing a visual image of another web page and includes employing a web browser which interfaces via the Internet with a web server including visualization functionality.

Preferably the visualization functionality operates to embed commands to the web browser to download, via an image server, images of web pages which are referenced in hyperlinks contained in the web page and to provide to a user, via the web browser, an annotated web page.

Additionally the annotated web page may include the web page having within it images of homepages linked with the web page.

Additionally in accordance with a preferred embodiment of the present invention the visualization functionality includes generation of a list of hyperlinks from a web page, elimination of links which refer back to a web server sending said web page, determination of whether redirection links are present and if so, visualizing an ultimate destination thereof and visualizing remaining hyperlinks.

Further in accordance with a preferred embodiment of the present invention the visualization functionality may also include receiving a list of hyperlinks, splitting a URL of each hyperlink into URL components including at least a path component and a host component, trimming a path component based on the consideration of finding the most representative image of a given web page and constructing a new URL including a trimmed path component.

There is also thus provided in accordance with a preferred embodiment of the present invention a method for generating a web page image database. The method includes receiving a list of URLs corresponding to web pages, the images of which it is desired to download into an image database, operating a multiplicity of downloaders simultaneously by supplying to each downloader one URL at a time, causing each downloader to retrieve from the Internet, a web page and embedded objects corresponding to the URL supplied to it, causing a thumbnail generator to render the web page and causing said thumbnail generator to shrink said rendered image of the web page and supply it to the downloader.

Further in accordance with a preferred embodiment of the present invention the method also includes deleting executable content from the web page.

Still further in accordance with a preferred embodiment of the present invention the method includes causing each downloader to retrieve from the Internet, a web page and embedded objects corresponding to the URL supplied to it and causing a thumbnail generator to operate a corresponding web browser to render the web page employ a locally stored copy of said web page and said embedded objects.

Additionally in accordance with a preferred embodiment of the present invention the method includes employing a web server for providing said locally stored copy of said web page and of said embedded objects to said web browser.

Furthermore in accordance with a preferred embodiment of the present invention the visual image of another web page appears hovering over said hyperlink.

There is further provided in accordance with another preferred embodiment of the present invention a system for presenting Internet information to a user including a first functionality providing to a user a visual image of a web page containing at least one hyperlink and a second functionality operative at least partially concurrently with said first functionality for providing a visual image of another web page of at least one web site which is represented by said at least one hyperlink.

Further in accordance with a preferred embodiment of the present invention the visual image of said another web page is displayed alongside the visual image of said web page.

Still further in accordance with a preferred embodiment of the present invention the visual images of said another web page is displayed within the visual image of said web page.

Furthermore in accordance with a preferred embodiment of the present invention the visual images of a plurality of other web pages represented by at least one hyperlink are displayed simultaneously along with said visual image of a web page containing at least one hyperlink.

Additionally in accordance with a preferred embodiment of the present invention the web page comprises an HTML page.

Further in accordance with a preferred embodiment of the present invention the second functionality comprises third functionality employing a web browser including visualization functionality which interfaces via the Internet with an image server.

Preferably the visualization functionality is operative to download via the image server from an image database images of web pages which are referenced in hyperlinks contained in the web page and to provide to a user, via the web browser, an annotated web page. Additionally or alternatively the annotated web page includes the web page having alongside it images of homepages linked with the web page.

Further in accordance with a preferred embodiment of the present invention the second functionality comprises fourth functionality employing a web browser which interfaces via the Internet with a web server including visualization functionality.

Preferably the visualization functionality is operative to embed commands to the web browser to download, via an image server, images of web pages which are referenced in hyperlinks contained in the web page and to provide to a user, via the web browser, an annotated web page. Additionally or alternatively the annotated web page includes the web page having within it images of homepages linked with the web page.

Further in accordance with a preferred embodiment of the present invention the visualization functionality includes the generation of a list of hyperlinks from a web page, the elimination of links which refer back to a web server sending said web page, the determination of whether redirection links are present and if so, visualizing an ultimate destination thereof and the visualizing remaining hyperlinks.

Still further in accordance with a preferred embodiment of the present invention the visualization functionality includes receiving a list of hyperlinks, splitting a URL of each hyperlink into URL components including at least a path component and a host component, trimming a path component based on the consideration of finding the most representative image of a given web page and constructing a new URL including a trimmed path component.

Furthermore in accordance with a preferred embodiment of the present invention the visual image of another web page appears hovering over said hyperlink.

Additionally in accordance with a preferred embodiment of the present invention the visual image of another web page appears hovering over said hyperlink.

Additionally or alternatively the visual image of another web page appears hovering over said hyperlink. Preferably the visual image of another web page appears hovering over said hyperlink.

Furthermore the visual image of another web page may appear to hover over said hyperlink.

Still further in accordance with a preferred embodiment of the present invention the visual image of another web page appears hovering over said hyperlink.

There is provided in accordance with yet another preferred embodiment of the present invention a system for generating a web page image database, the system includes at least one downloader receiving one URL at a time and retrieving from the Internet a web page and embedded objects corresponding to the URL received by it and at least one thumbnail generator operative to render the web page, shrink said rendered image of the web page and supply said rendered image to the downloader.

Further in accordance with a preferred embodiment of the present invention the at least one downloader is operative to delete executable content from the web page.

Still further in accordance with a preferred embodiment of the present invention each downloader retrieves from the Internet, a web page and embedded objects corresponding to the URL received by it and locally stores a copy of said web page and said embedded objects and causes said thumbnail generator to render the web page by employing said locally stored copy of said web page and said embedded objects.

Preferably the system also includes a web server providing said locally stored copy of said web page and of said embedded objects.

BRIEF DESCRIPTION OF THE DRAWINGS

The present invention will be understood and appreciated more fully from the following detailed description, taken in conjunction with the drawings in which.

LIST OF APPENDICES

Appendix A is a software listing in hexadecimal form of software suitable for providing the visualization functionality of FIG. 1 when installed in accordance with installation instructions set forth hereinbelow;

Appendix B is a software listing in hexadecimal form of software suitable for providing the functionality of FIG. 6 when installed in accordance with installation instructions set forth hereinbelow;

Appendix C is a software listing in hexadecimal form of software suitable for providing the functionality of an image server of FIG. 1 and FIG. 2 when installed in accordance with installation instructions set forth hereinbelow.

The foregoing software listing are protected by copyright in the USA and in all other jurisdictions.

Appendix A. Appendix B and Appendix C are included on Copy 1 and Copy 2 of the CD-Rs attached herewith to the present application. Each CD-R includes the files GIRAFA-.hex (Appendix A) of Nov. 7, 2000 and of length 3,052,711 bytes; ARANHA.hex (Appendix B) of Nov. 7, 2000 and of length 5,498.984 bytes and IMAGE.hex (Appendix C) of Nov. 7, 2000 and of length 217,154 bytes.

DESCRIPTION OF PREFERRED EMBODIMENTS

Figure 1:
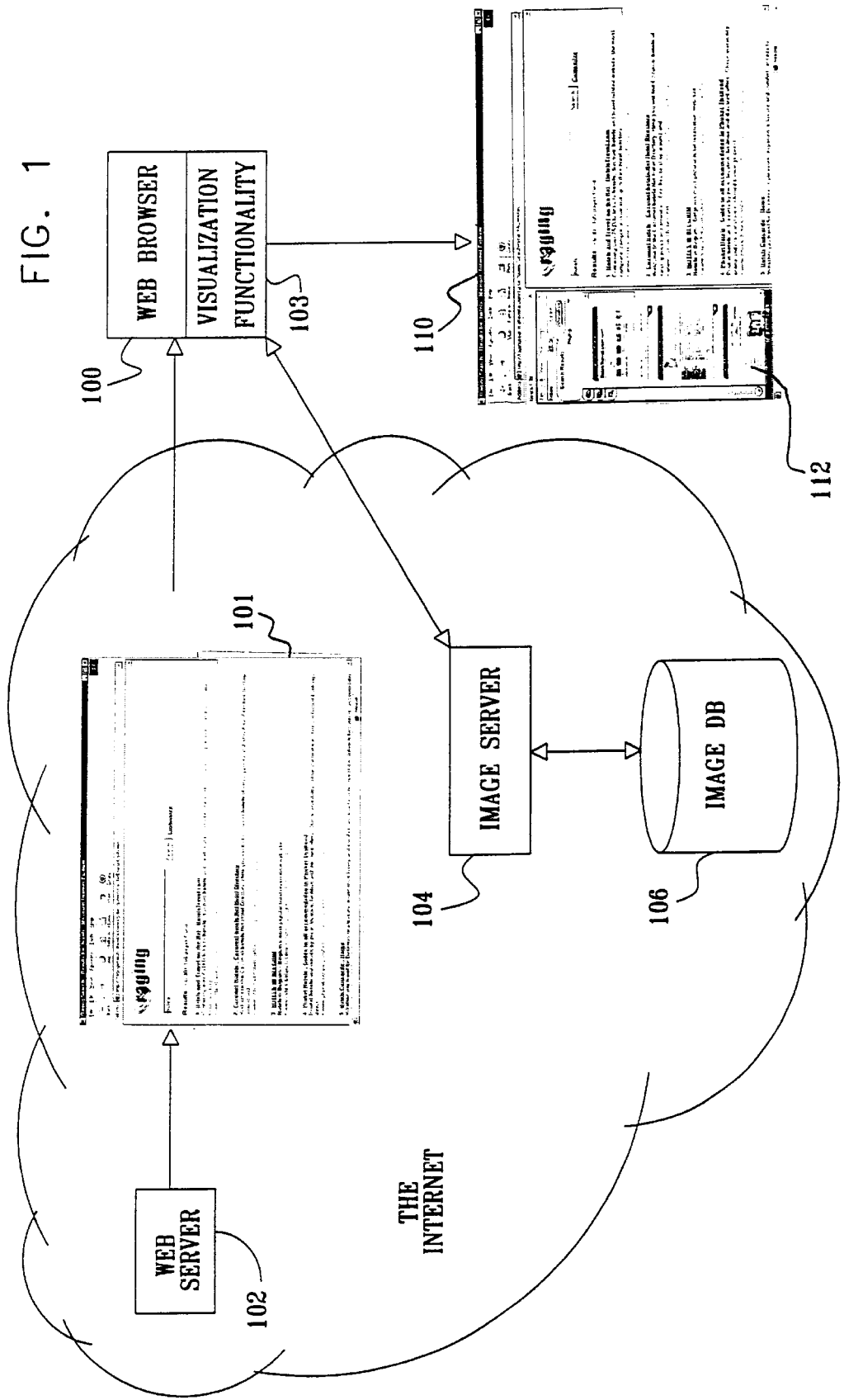
FIG. 1 is a simplified partially pictorial, partially block diagram illustration of a system and methodology for displaying information received over the Internet in accordance with a preferred embodiment of the present invention.

Reference is now made to FIG. 1, which is a simplified partially pictorial, partially block diagram illustration of a system and methodology for displaying information received over the Internet in accordance with a preferred embodiment of the present invention. As seen in FIG. 1, a web browser 100, such as Microsoft Internet Explorer 5.5, typically resident on a PC, such as a Dell Dimension L733 running Microsoft Windows 98, receives a web page 101, such as an HTML page, over the Internet from a web server 102. The web browser 100 preferably includes visualization functionality 103 which interfaces, typically via the Internet, with an image server 104, such as a Dell Power Edge 2450 running Apache 1.3.12 on an OpenBSD 2.7 operating system.

The image server 104 interfaces with an image database 106, which is preferably a Dell Power Edge 2450 running MySQL 3.23.25 on an OpenBSD 2.7 operating system which is preferably loaded by using functionality of the type described hereinbelow with reference to FIG. 7.

The visualization functionality 103 is operative to download via the image server 104 from the image database 106 images of web pages which are referenced in hyperlinks contained in the web page 101 and to provide to a user, via the web browser 100, an annotated web page 110, which preferably includes the web page 101 having alongside it images 112 of homepages linked with web page 101.

Figure 2:
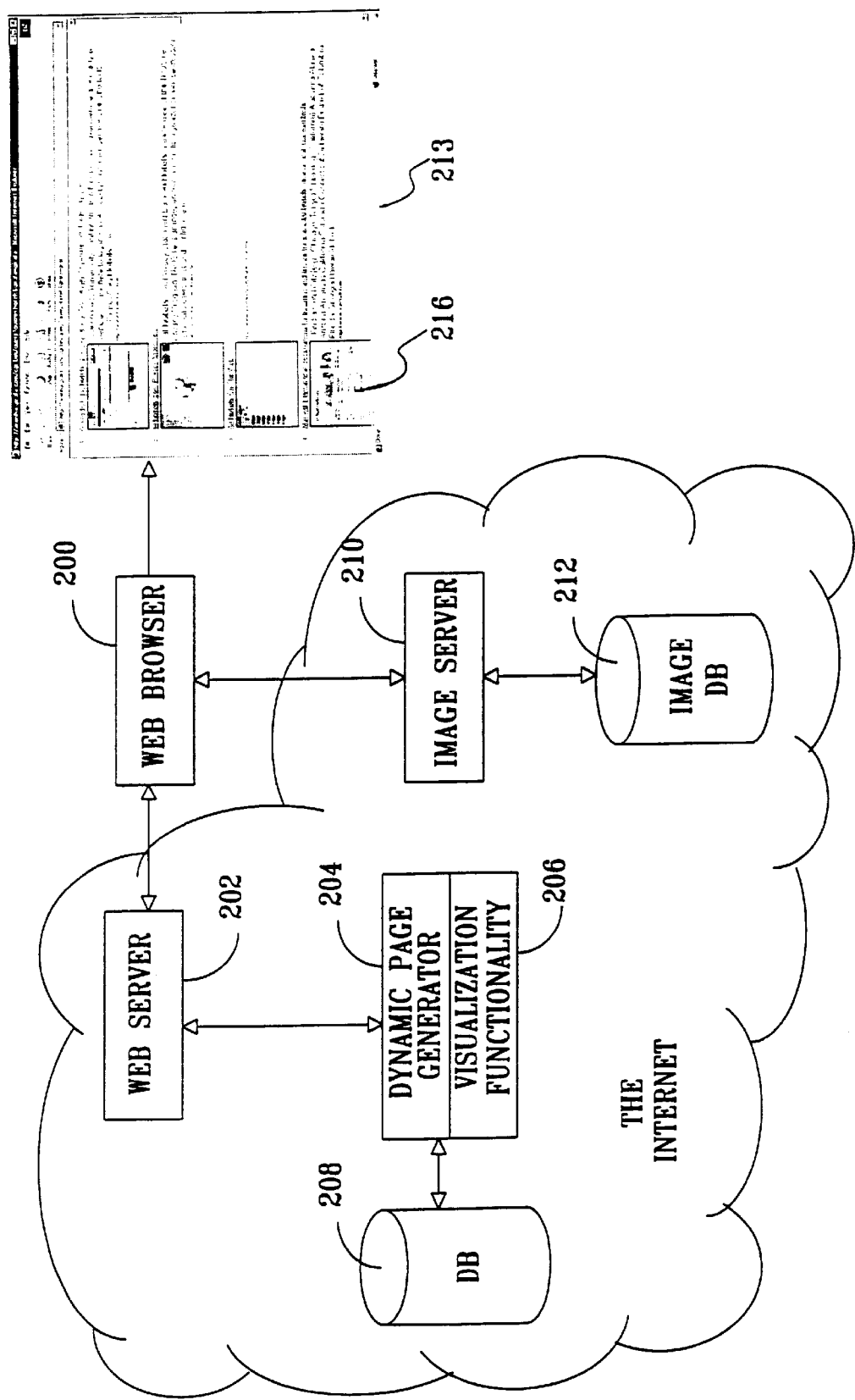
FIG. 2 is a simplified partially pictorial, partially block diagram illustration of a system and methodology for displaying information received over the Internet in accordance with another preferred embodiment of the present invention.

Reference is now made to FIG. 2, which is a simplified partially pictorial, partially block diagram illustration of a system and methodology for displaying information received over the Internet in accordance with another preferred embodiment of the present invention. As seen in FIG. 2, a web browser 200, typically resident on a PC, such as a Dell Dimension L733 running Microsoft Windows 98, interfaces, typically via the Internet, with a web server 202, such as a Dell Power Edge 2450 running Apache 1.3.12 on an OpenBSD 2.7 operating system.

The web server 202 interfaces with a dynamic page generator 204, such as a P.H.P. 4.0.2, in which is preferably installed a visualization functionality 206, which is described hereinbelow in greater detail. The dynamic page generator 204 interfaces with a database 208, such as a Dell Power Edge 2450 running MySQL 3.23.25 on an OpenBSD 2.7 operating system.

The web browser 200 preferably interfaces with an image server 210, such as a Dell Power Edge 2450 running Apache 1.3.12 on an OpenBSD 2.7 operating system. The image server 210 interfaces with an image database 212, which is preferably a Dell Power Edge 2450 running MySQL 3.23.25 on an OpenBSD 2.7 operating system, which is preferably loaded by using functionality of the type described hereinbelow with reference to FIG. 7.

The visualization functionality 206 is operative to embed within a dynamically generated web page, such as an HTML page, commands to the web browser 200 to download via the image server 210 from the image database 212 images of web pages which are referenced in hyperlinks contained in a web page 213 and to provide to a user, via the web browser 200, the web page 213 annotated to include therewithin images 216 of homepages linked therewith.

It is appreciated that either or both of the embodiments of FIGS. 1 and 2 may provide images of web pages which are referenced in hyperlinks contained in a web pave either alongside or within that web page. It is also appreciated that either or both of the embodiments FIGS. 1 and 2 may provide images of web pages which are referenced in hyperlinks contained in a web page, which images hover either over or alongside the hyperlinks. It is appreciated that the visual image of another web page may function as a hyperlink.

Figure 3:
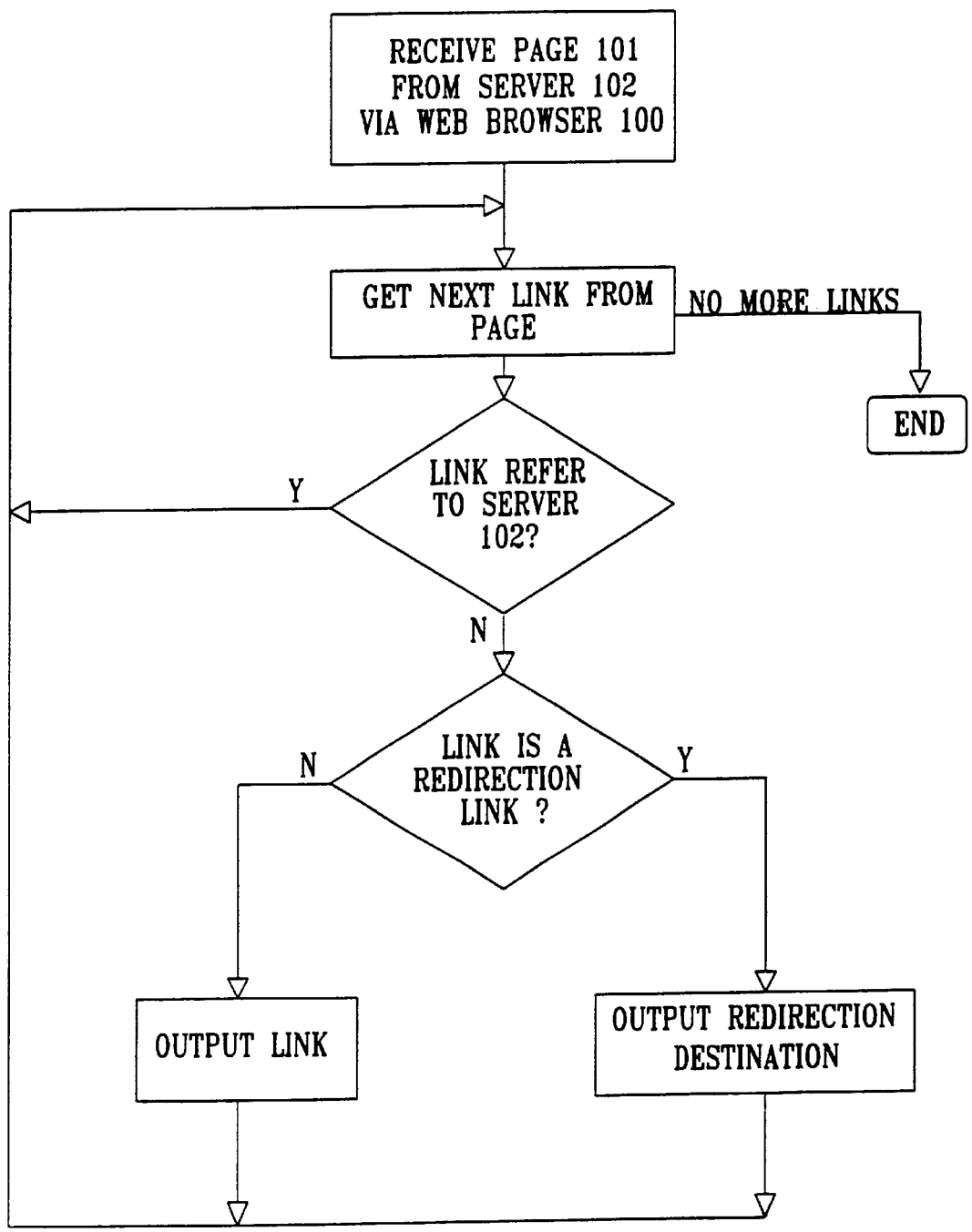
FIG. 3 is a simplified flow chart of part of visualization functionality employed in the system and methodology of FIG. 1.

Reference is now made to FIG. 3, which is a simplified flow chart of part of visualization functionality employed in the system and methodology of FIG. 1. The flow chart of FIG. 3 illustrates generation of a list of hyperlinks from a web page, such as web page 101 in the embodiment of FIG. 1 received from a web server 102.

As each link is extracted from web page 101, an examination is made in order to eliminate links which refer back to web server 102 and to determine whether redirection links are present. This is typically done by searching for the presence of a string "http://" encoded in the URL, which characterizes a redirection link. In the case of links, which appear to be redirection links, only the ultimate destination is listed In the case of links which do not appear to be redirection links, the links themselves are listed. The resulting list is employed as an input to the functionality of FIG. 4.

In the illustrated embodiment of FIG. 3, all of the hyperlinks are processed. Alternatively, not all of the hyperlinks need be processed. In such a case, a user may decide which hyperlinks to process.

Figure 4:
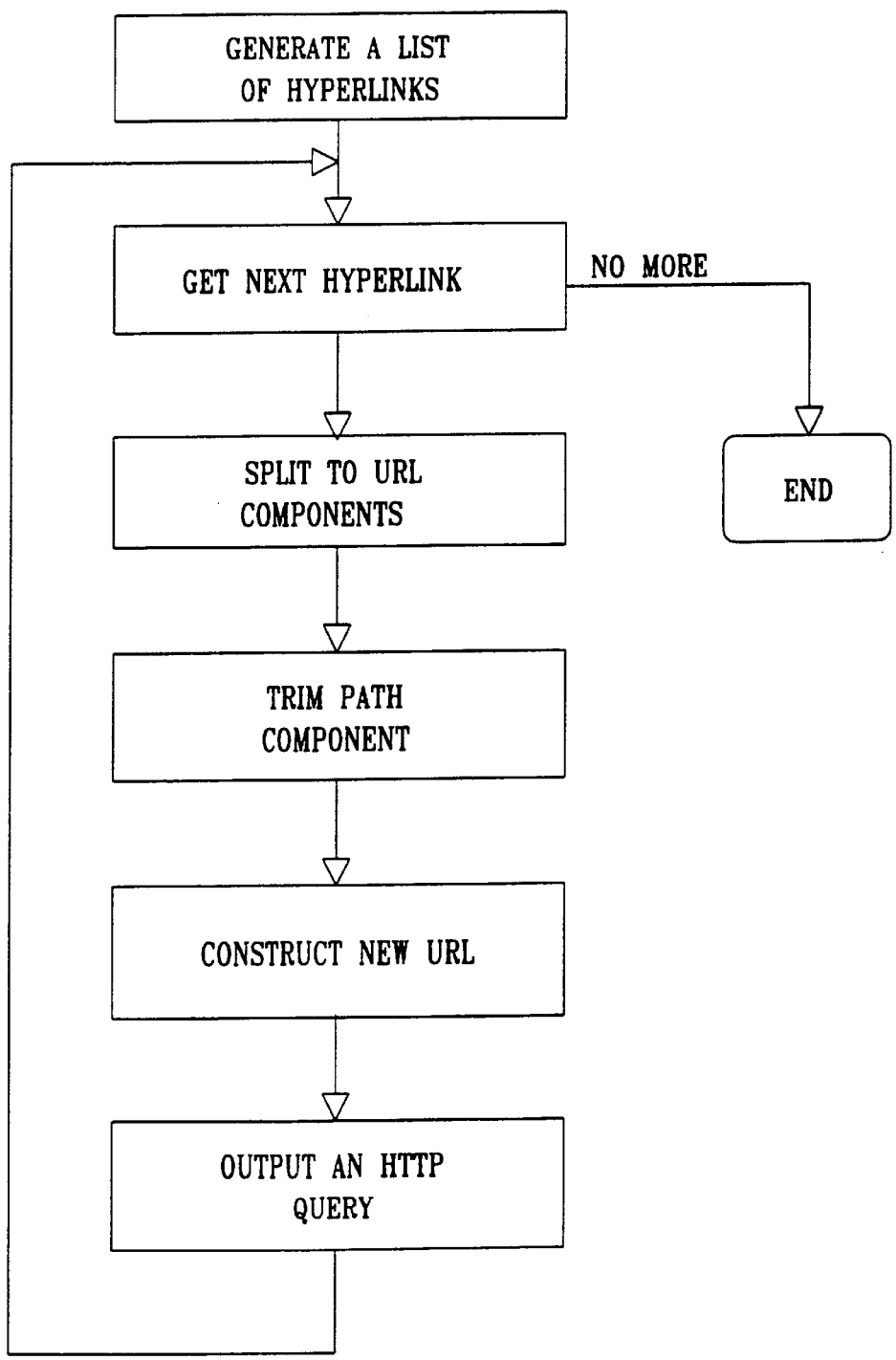
FIG. 4 is a simplified flow chart of visualization functionality employed in accordance with a preferred embodiment of the present invention.

Reference is now made to FIG. 4, which is a simplified flow chart of visualization functionality employed in accordance with a preferred embodiment of the present invention. As seen in FIG. 4, a list of hyperlinks is received. This list may be derived from a web page such as web page 101 in the embodiment of FIG. 1 using the functionality of FIG. 3 or may be provided by dynamic page generator 204 and obtained via database 208 in the embodiment of FIG. 2.

If hyperlinks are present, the URL of each hyperlink is split into URL components. For example, if the URL of a hyperlink appears as follows:

http://www.microsoft.com:80/windows2000/upgrade/
   compat/search/computers.asp?page=2&send=1&Order=
   Sort+by+Company&CN=Dell&PN=&PT=

The components thereof include the following:
Scheme: http
Host: www.microsoft.com
Port: 80
Path: /windows2000/upgrade/compat/search/computers.asp
Query: page=2&send=1&Order=Sort+by+Company&CN=
   Dell&PN=& PT=

The path component may be trimmed based on the consideration of finding the most representative image of a given web page. A flow chart illustrating a preferred algorithm for making this determination appears in FIG. 5 and is described hereinbelow.

Thus, in the above example, the trimmed path component appears as follows:

/windows2000/upgrade

Following any trimming of the path component, a new URL is constructed from the scheme, host, port and trimmed path components. This URL is employed for outputting an http query to an image server, such as image server 104 in the embodiment of FIG. 1 or 210 in the embodiment of FIG. 2.

Figure 5:
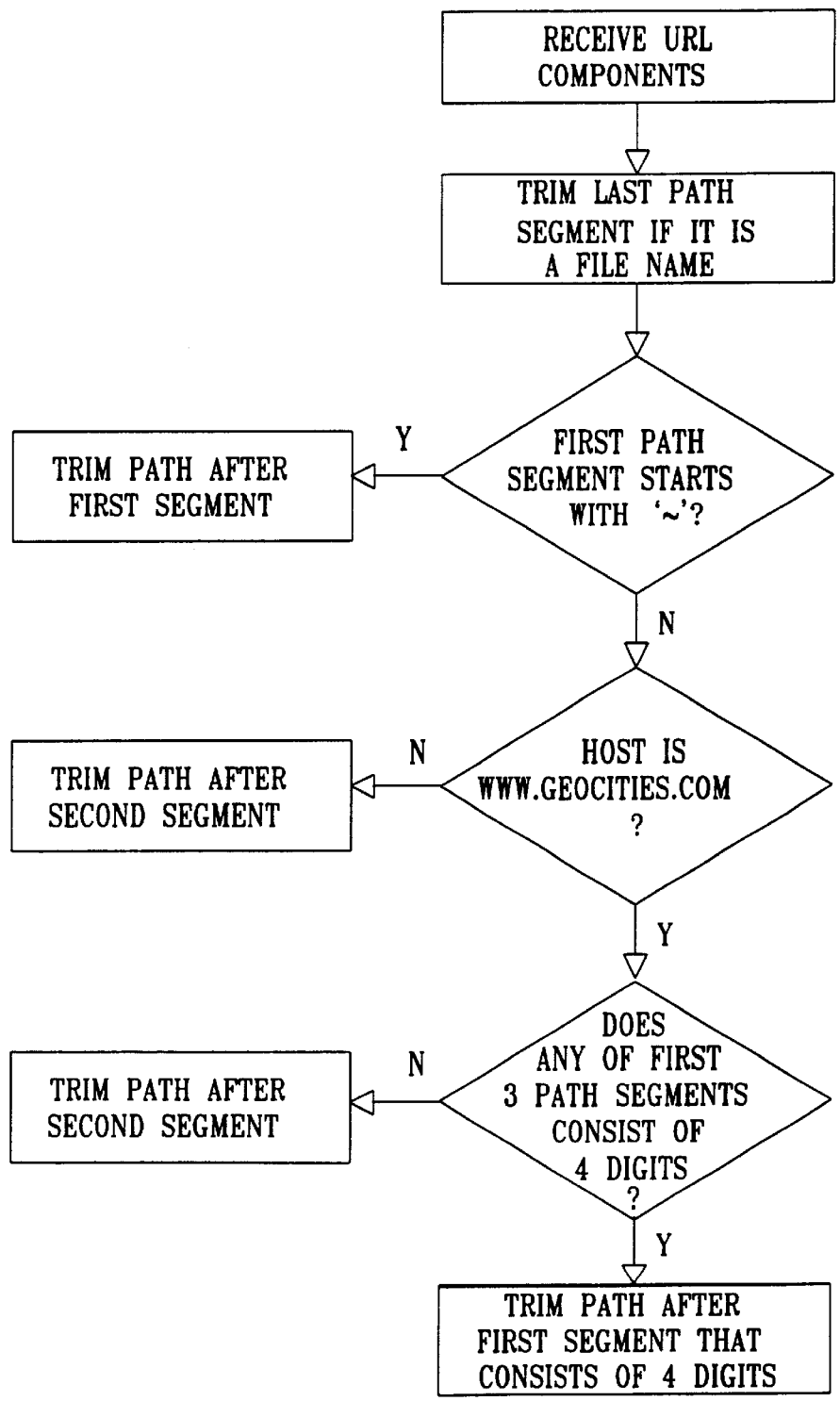
FIG. 5 is a simplified flow chart of path component trimming functionality employed in the embodiment of FIG. 3.

A preferred form of http query in the above example appears as follows:

http://wb1.girafa.com/srv/i?
   u=http://
      www.microsoft.com%2fwindows2000%2fupgrade Reference is now made to FIG. 5, which is a simplified flow chart of path component trimming functionality employed in the embodiment of FIG. 4. As seen in FIG. 5, the path component trimming functionality comprises receipt of the URL components after splitting thereof, as described hereinabove with reference to the flowchart of FIG. 4. Information from the host component of the URL is employed in trimming of the path component of the URL. Each path component comprises a plurality of path segments.

If the last path segment in a path component is a file name, this path segment is removed. Determination whether a path component is a file name is typically carried out by examining the suffix thereof to determine whether it is a known suffix representing a file name.

If the first path segment starts with a "~", which typically designates a home directory in a Unix system, the path component is trimmed after that first path segment.

If the host is not wwvw.geocities.com, the path component is trimmed after the second path segment.

If the host is www.geocities.com and any of the first three path segments consists of 4 digits, the path component is trimmed after the first segment that consists of 4 digits.

If the host is % www.geocities.com and none of the first three path segments consists of 4 digits, the path component is trimmed after the second segment.

Figure 6:
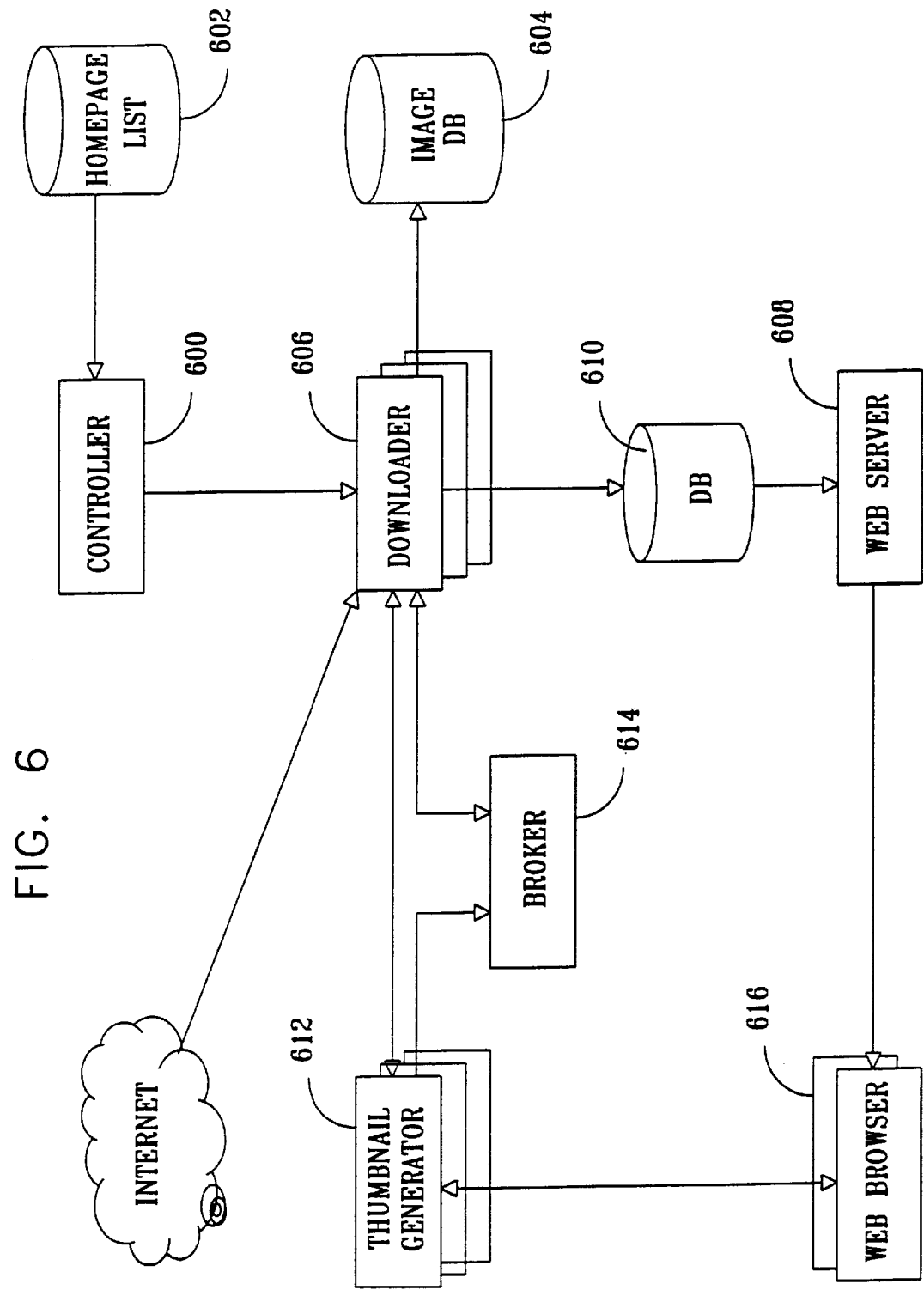
FIG. 6 is a simplified block diagram illustration of a system for generating an image database useful in the system and methodology of FIGS. 1 and 2.

Reference is now made to FIG. 6, which is a simplified block diagram illustration of a system for generating an image database useful in the system and methodology of FIGS. 1 and 2. As seen in FIG. 6, a controller 600 receives a list 602 of homepages, the images of which it is desired to download into an image database 604, such as image database 106 in the embodiment of FIG. 1 or image database 212 in the embodiment of FIG. 2.

The controller 600 operates a multiplicity of downloaders 606 simultaneously by supplying to each downloader one URL at a time. Each downloader 606 retrieves from the Internet, the homepage and the embedded objects corresponding to the URL supplied to it by the controller 600 and deletes therefrom executable block content. The resulting output of the downloaders 606 is supplied to a web server 608 via a database 610.

Each downloader 606 establishes a connection with one of a plurality of thumbnail generators 612 via a broker 614. Once this connection has been established, a URL of a locally stored copy of a downloaded homepage, which is stored in database 610, is sent to the thumbnail generator 612 with which the connection has been established.

Each thumbnail generator 612 operates a corresponding web browser 616 to download via web server 608 the locally stored copy of the homepage, which is stored in database 610. The thumbnail generators 612 each receive a rendered image of the homepage from a corresponding web browser 616 and shrink it and supply it to the downloader 606 with which the connection has been established.

It is appreciated that normally the number of downloaders exceeds the number of thumbnail generators by at least an order of magnitude. The broker 614 coordinates interaction between a thumbnail generator and a downloader.

Figure 7:
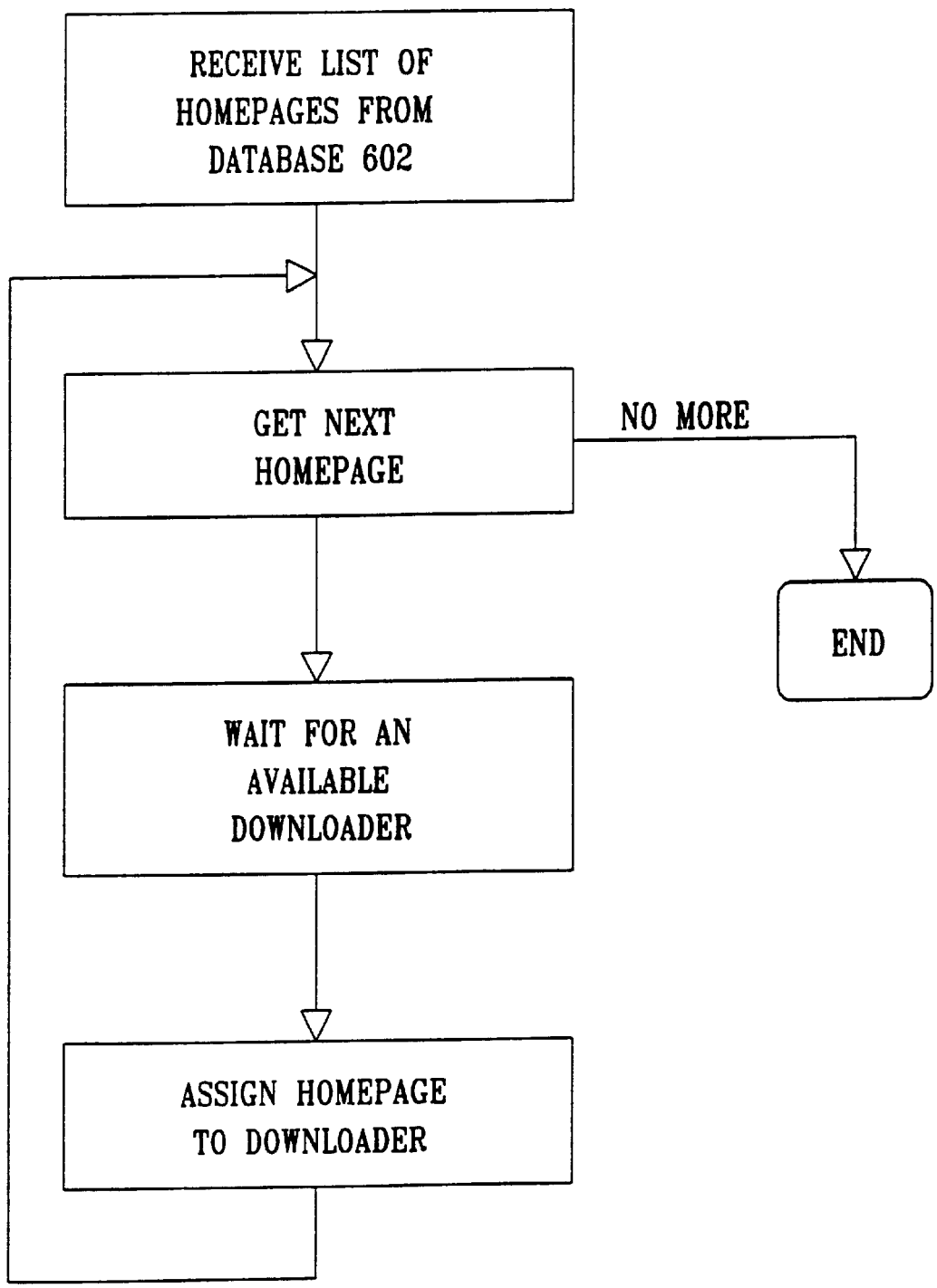
FIG. 7 is a flow chart illustrating operation of a controller forming part of the system of FIG. 6.

Reference is now made to FIG. 7, which is a flow chart illustrating operation of a controller forming part of the system of FIG. 6. A list of homepages is received from database 602 (FIG. 6). Each homepage is taken from the list and downloaded by a downloader 606 (FIG. 6). The functionality of FIG. 7 ensures that a predetermined number of downloaders operate simultaneously, so long as the list of undownloaded homepages is sufficiently long.

Figure 8:
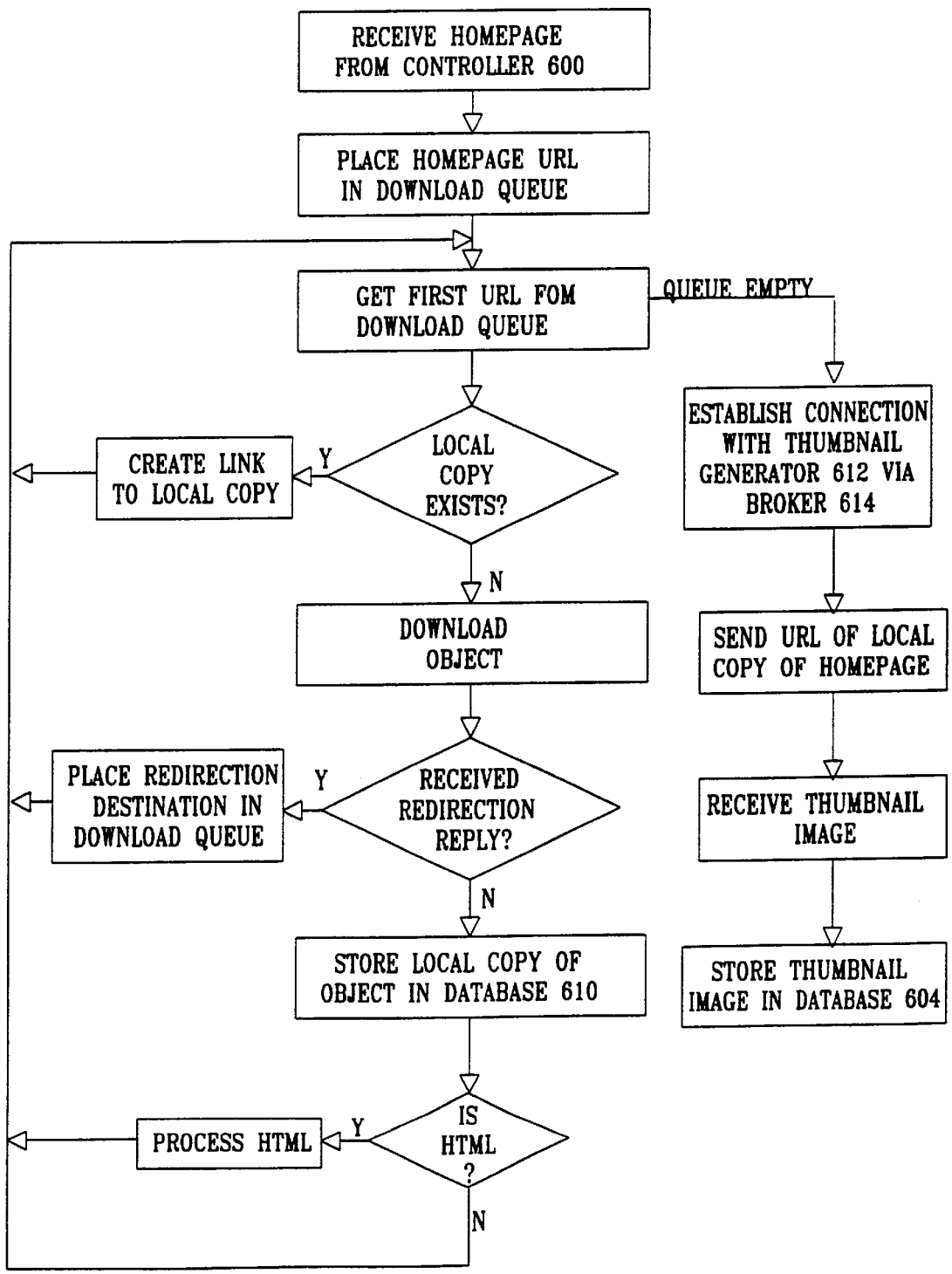
FIG. 8 is a floss chart illustrating operation of a downloader forming part of the system of FIG. 6.

Reference is now made to FIG. 8, which is a flow chart illustrating operation of a downloader forming part of the system of FIG. 6. As seen in FIG. 8, each downloader maintains a download queue for the homepage which the downloader is currently downloading. The download queue includes a list of URLs of objects in the homepage as well as the homepage object that require downloading in order to provide a local copy of the homepage.

For each URL in the download queue, an inquiry is made whether a local copy of the object corresponding thereto already exists. If so, a link to that local copy is created. If not, an attempt is made to download the object. If upon attempting to download the object, the downloader is informed that the object is located on another URL. i.e. by the receipt of redirection reply, that URL is placed in the download queue.

If, the download is successful, the downloaded object is stored in database 610 (FIG. 6) as a local copy. If the downloaded object is an HTML page, then the HTML page is processed, preferably by an algorithm of the type described hereinbelow in FIG. 9.

When the download queue is empty, a connection is established with thumbnail generator 612 (FIG. 6) via broker 614 (FIG. 6). The URL of the local copy of the homepage object is sent to the thumbnail generator 612 and a thumbnail image of the homepage is generated hereby. This thumbnail image is stored in image database 604 (FIG. 6).

Figure 9:
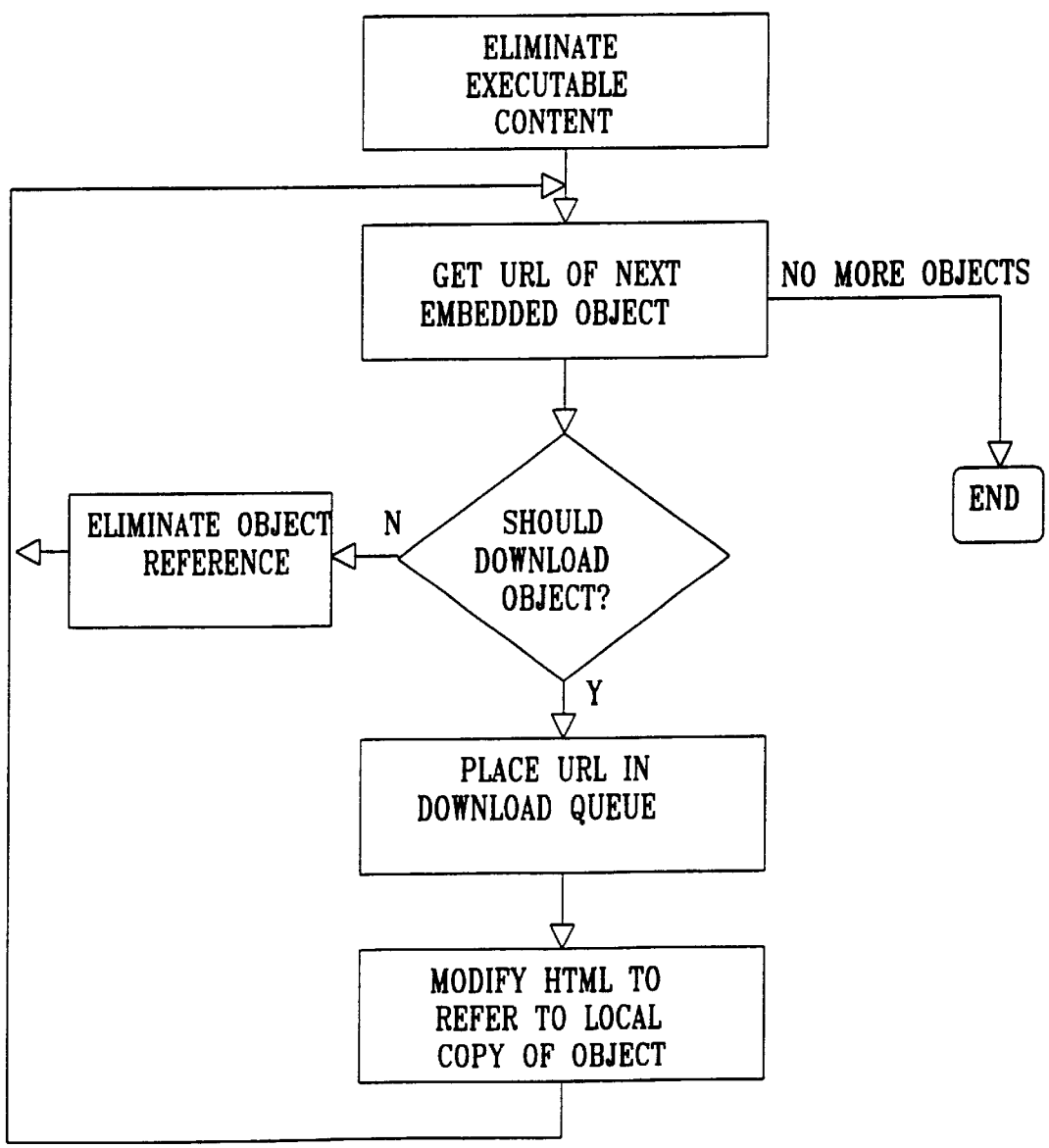
FIG. 9 is a flow chart illustrating operation of a process HTML algorithm employed in the downloader of FIG. 8.

Reference is now made to FIG. 9, which is a flow chart illustrating operation of a process HTML algorithm employed in the downloader of FIG. 8. The HTML object which is downloaded is scanned, the executable content thereof is eliminated and embedded objects therein are recognized.

For each embedded object a decision is made whether to download it. This decision is made based on the nature of the embedded object and the nature of the reference thereto. Generally, images and HTML objects are downloaded.

URLs of objects to be downloaded are placed in the download queue referred to hereinabove in connection with FIG. 8 and the HTML object is modified to refer to the local copies of the objects to be downloaded. References to objects not to be downloaded are eliminated from the HTML object.

Figure 10:
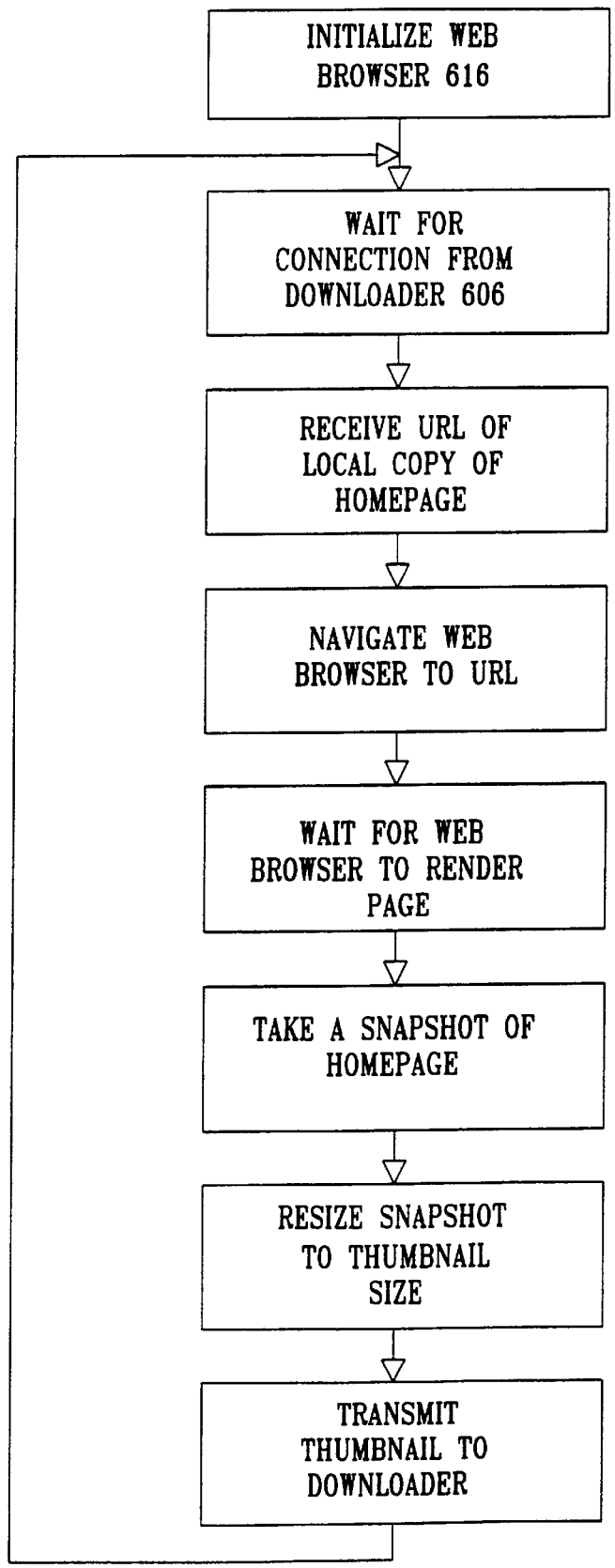
FIG. 10 is a flow chart illustrating operation of a thumbnail generator forming part of the system of FIG. 6.

Reference is now made to FIG. 10, which is a flow chart illustrating operation of a thumbnail generator, such as thumbnail generator 612, forming part of the system of FIG. 6. Initially, the thumbnail generator initializes a web browser functionality 616 (FIG. 6). When a connection is established to the thumbnail generator 612 from a downloader 606 (FIG. 6) via a broker 614 (FIG. 6), the thumbnail generator 612 receives the URL of the local copy of the homepage.

The web browser navigates to that URL and renders the homepage. A snapshot of the homepage is taken, typically in bitmap form. This snapshot is resized to a desired thumbnail size and is then transmitted via the downloader 606 for storage in image database 604.

Figure 11:
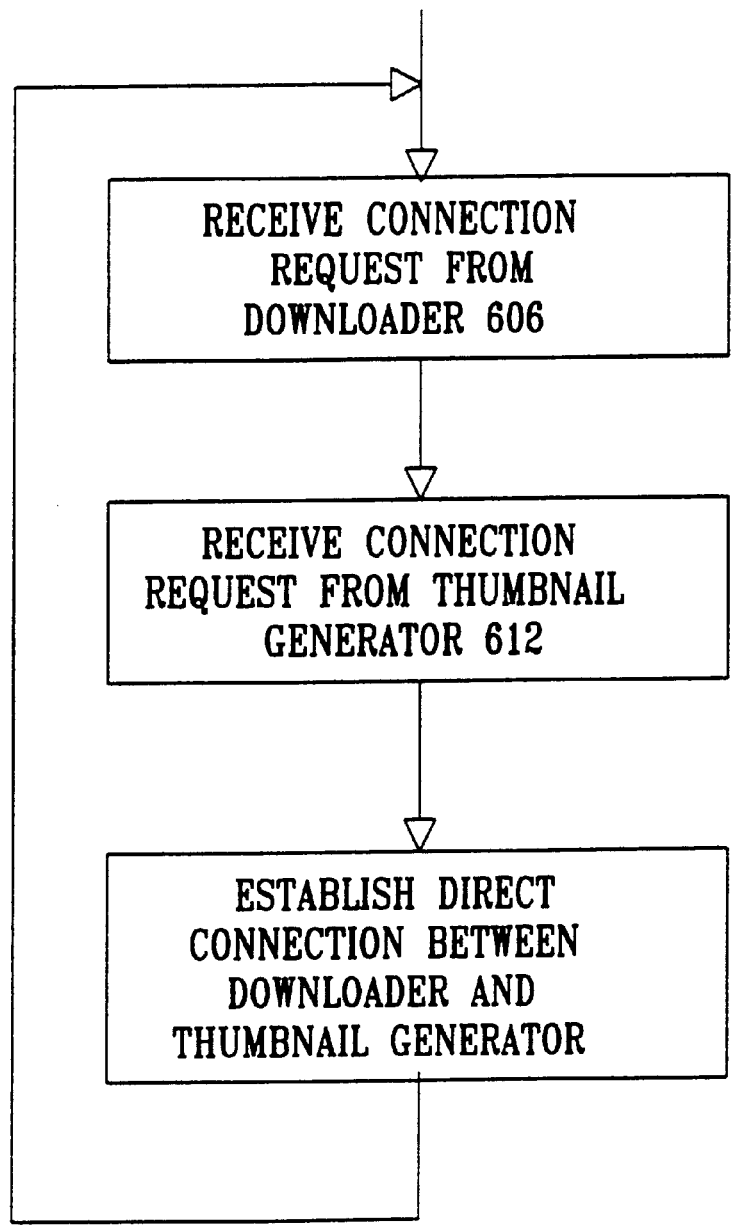
FIG. 11 is a flow chart illustrating operation of a broker forming part of the system of FIG. 6.

Reference is now made to FIG. 11, which is a flow chart illustrating operation of a broker, such as broker 614, forming part of the system of FIG. 6. The broker receives connection requests from both thumbnail generators 612 (FIG. 6) and downloaders 606 (FIG. 6). When simultaneous requests are pending from both a thumbnail generator and a downloader, the broker establishes a direct connection therebetween. When there exists a surplus of connection requests from either thumbnail generators 612 or downloaders 606, queues of such connection requests may be maintained by the broker.

A preferred method for constructing A Framework For Providing Visual Context To WWW Hyperlinks in accordance with a preferred embodiment of the present invention includes the following steps:
1. Generate Binary file GIRAFA.hex from the computer listing of Appendix A.
2. Decode GIRAFA.hex using a MIME compliant decoder, creating Girafa-1-45.exe.

The method for starting the visualization functionality of FIG. 1 with the program in Appendix A includes the following steps:
1. Provide a computer terminal such as an Intel-based Pentium III 800 MHz computer, configured with Microsoft Windows 98 operating system, and Internet Explorer 5.5 Web Browser.
2. Load the file Girafa-1-45.exe to a temporary directory in the computer terminal provided in step 1, Execute the file Girafa-1-45.exe, and follow the installation instructions. When asked to register, press 'cancel'.
3. Edit the file Girafa.ini in the installation directory, replacing every occurrence of the string 'aranha.girafa.com' with the hostname of the image server, and every occurrence of the number 8080 with the number 80.
4. Start the Internet Explorer browser.
5. In the Internet Explorer Window select the View Menu, in it select the Explorer Bars sub-menu, and in it choose GirafaBar.
6. Follow the registration procedure.

A further preferred method for constructing A Framework For Providing Visual Context To WWW Hyperlinks in accordance with a preferred embodiment of the present invention includes the following steps:
1. Generate Binary file ARANHA.hex from the computer listing of Appendix B.
2. Decode ARANHA.hex using a MIME compliant decoder, creating aranha.tgz.

The method for providing the functionality of FIG. 6 with the program in Appendix B includes the following steps:
1. Provide a computer server such as a Dell PowerEdge 2450, with at least 1 GB of main memory, configured with OpenBSD 2.7 operating system, and MySQL 3.23.25 database, and connected to the Internet.
2. Create the directory /var/www/httpd/collect.
3. Create the directory /data1.
4. In /data1 extract the file aranha.tgz by using the command 'tar xvfz aranha.tgz', creating /data1/aranha/aranha.conf, /data1/aranha/capture.zip, /data1/aranha/db.def, /data1/aranha/mod_asis.so, /data1/aranha/bin, /data1/aranha/bin/broker, /data1/aranha/bin/controller, /data1/aranha/bin/downloader, /data1/aranha/bin/downloader.real, and a skeleton image directory /data1/aranha/images.
5. Edit the file /data1/aranha/aranha.conf, replacing the string <SERVER_IP_ADRESS> with the server's IP address, the string <DBUSER> with a MySQL username that have full access to database named DATA, and the string <DBPASSWORD> with the password of that user.
6. Create the MySQL database, and initialize it by running the MySQL script /data1/aranha/db.def.
7. Set the environment variable ARANHA_CONF to /data1/aranha/aranha.conf.
8. Execute, in the background, the program /data1/aranha/bin/broker.
9. Install the apache module mod_asis.so by changing directory to /data1/aranha, and executing the command 'apxs -a -i mod_asis.so'.
10. Set the handle_asis as the Apache web server handler for files with suffix '.y'.
11. Start the Apache web server.
12. Provide a computer server such as a Dell PowerEdge 2450, with a display adapter capable of displaying a resolution of 1600×1280×32, such as an ATI ALL-IN-WONDER 128 32MB PCI, and an ethernet adapter such as a Netgear FA310TX, configured with Windows NT Workstation 4.0 SP4, connected via Ethernet to the computer server provided in step 1.
13. Transfer the file data1/aranha/capture.zip to the computer server provided in step 12.
14. Extract capture.zip using a WinZip 7.0 compliant decoder, to the directory c:\appl, creating c:\appl\_1Source.dll, c:\app\CapturWeb.exe, c:\appl\CaptureWeb.ini, c:\app\Mfc42d.dll, c:\app\Mfcn42d.dll, c:\app\Mfco42d.dll, c:\app\Msvcrtd.dll, c:\appl\runCaptureWeb.exe.
15. Edit the tile c:app\CaptureWeb.ini replacing the string <SERVER_IP_ADDRESS> with the IP address of the OpenBSD server as provided by Step 1.
16. Execute the application c:\app\runCaptureWeb.exe.
17. Create a list of hostnames the thumbnail of their home pages is to be created, and store in the file /tmp/list.
18. Execute the application /data1/aranha/bin/controller to download the thumbnail images of hosts listed in /tmp/list by running the command '/data1/aranha/bin/controller/ tmp/list'.

Another preferred method for constructing A Framework For Providing Visual Context To WWW Hyperlinks in accordance with a preferred embodiment of the present invention includes the following steps:

1. Generate Binary file IMAGE.hex from the computer listing of Appendix C.
2. Decode IMAGE.hex using a MIME compliant decoder, creating image_server.tgz.

The method for providing providing the functionality of an image server of FIGS. 1 and 2 includes the following steps:
1. Provide a computer server such as a Dell PowerEdge 2450, with at least 1 GB of main memory, configured with OpenBSD 2.7 operating system. MySQL 3.23.25 database, and an image database created by the software provided in Appendix B, and Connected to the Internet.
2. Extract the binary file of Appendix C using the command 'tar xvfz image_server.tgz', creating the directories image_server and image_server/errs, and the files image_server/aranha.conf, image_server/mod_girafa.so, image_server/errs/empty, and image_servers/errs/notFL.gif
3. Change directory to image_server
4. Install the apache module mod_girafa.so by executing the command 'apxs -a -i mod_girafa.so'
5. copy the file aranha.conf to /data1/aranha/aranha.conf
6. Create the directory /var/www/htdocs/errs
7. Copy the files errs/empty and errs/notFL.gif to /var/www/htdocs/errs
8. Start the apache web server.

It will be appreciated by persons skilled in the art that the present invention is not limited by what has been particularly shown and described hereinabove. Rather the scope of the present invention includes both combinations and subcombinations of the various features described hereinabove as well as variations and modifications which would occur to persons skilled in the art upon reading the specification and which are not in the prior art.

What is claimed is:

1. A method for presenting Internet information to a user comprising:
   providing to a user a visual image of a web page containing at least one hyperlink; and at least partially concurrently
   providing a thumbnail visual image of the home page of at least one web site which is represented by said at least one hyperlink via the Internet by employing an image server that stores and provides said thumbnail visual image.

2. A method according to claim 1 and wherein said thumbnail visual image is displayed alongside the visual image of said web page.

3. A method according to claim 2 and wherein said thumbnail visual image appears hovering over said hyperlink.

4. A method according to claim 1 and wherein said thumbnail visual image is displayed within the visual image of said web page.

5. A method according to claim 4 and wherein said thumbnail visual image appears hovering over said hyperlink.

6. A method according to claim 1 and wherein a plurality of thumbnail visual images represented by at least one hyperlink are displayed simultaneously along with said visual image of a web page containing at least one hyperlink.

7. A method according to claim 1 and wherein said web page comprises an HTML page.

8. A method according to claim 1 and wherein said providing a-thumbnail visual image comprises:
   employing a web browser including visualization functionality which interfaces via the Internet with said image server.

9. A method according to claim 8 and wherein said visualization functionality is operative to download via the image server from an image database images of web pages which represent hyperlinks contained in the web page and to provide to a user, via the web browser, an annotated web page.

10. A method according to claim 8 and wherein said visualization functionality comprises:
    generation of a list of hyperlinks from a web page;
    elimination of links which refer back to a web server sending said web page;
    determination of whether redirection links are present and if so, providing thumbnail visual images of ultimate destinations thereof; and
    providing thumbnail visual images of remaining hyperlinks.

11. A method according to claim 8 and wherein said visualization functionality comprises:
    receiving a list of hyperlinks;
    splitting a URL of each hyperlink into URL components including at least a path component and a host component;
    trimming a path component based on the consideration of finding the most representative image of a given web page; and
    constructing a new URL including a trimmed path component.

12. A method according to claim 1 and wherein said providing a-thumbnail visual image comprises:
    employing a web browser which interfaces via the Internet with a web server including visualization functionality.

13. A method according to claim 12 and wherein said visualization functionality is operative to embed commands to the web browser to download, via said image server, thumbnail visual images of web pages which represent hyperlinks contained in the web page and to provide to a user, via the web browser, an annotated web page.

14. A method according to claim 13 and wherein said annotated web page includes the web page having within it thumbnail visual images of homepages of web sites referenced by hyperlinks contained in the web page.

15. A method according to claim 1 and wherein said thumbnail visual image appears hovering over said hyperlink.

16. A method for generating an image server database of thumbnail visual images of web pages, the method comprising:
    receiving a list of URLs corresponding to said web pages, the thumbnail visual images of which it is desired to supply to said image server database;
    operating a multiplicity of downloaders simultaneously to retrieve from the Internet, web pages and embedded objects corresponding to URLs from said list;
    causing a thumbnail generator to render retrieved web pages retrieved simultaneously by said multiplicity of downloaders; and
    causing said thumbnail generator to shrink said rendered images of said retrieved web pages and supply them to said image server database.

17. A method according to claim 16 also comprising deleting executable content from said retrieved web pages.

18. A system for presenting Internet information to a user comprising:
    first functionality providing to a user a visual image of a web page containing at least one hyperlink; and second functionality operative at least partially concurrently with said first functionality for providing a thumbnail visual image of the home page of at least one web site which is represented by said at least one hyperlink via the Internet by employing an image server that stores and provides said thumbnail visual image.

19. A system according to claim 18 and wherein said thumbnail visual image is displayed alongside the visual image of said web page.

20. A system according to claim 19 and wherein said thumbnail visual image appears hovering over said hyperlink.

21. A system according to claim 18 and wherein said thumbnail visual image is displayed within the visual image of said web page.

22. A system according to claim 21 and wherein said thumbnail visual image appears hovering over said hyperlink.

23. A system according to claim 18 and wherein a plurality of thumbnail visual images represented by at least one hyperlink are displayed simultaneously along with said visual image of a web page containing at least one hyperlink.

24. A system according to claim 18 and wherein said web page comprises an HTML page.

25. A system according to claim 18 and wherein said second functionality comprises third functionality employing a web browser including visualization functionality which interfaces via the Internet with said image server.

26. A system according to claim 25 and wherein said visualization functionality is operative to download via the image server from an image database images of web pages which represent hyperlinks contained in the web page and to provide to a user, via the web browser, an annotated web page.

27. A system according to claim 25 and wherein said visualization functionality comprises:
   generation of a list of hyperlinks from a web page;
   elimination of links which refer back to a web server sending said web page;
   determination of whether redirection links are present and if so, providing thumbnail visual images of ultimate destinations thereof; and
   providing thumbnail visual images of remaining hyperlinks.

28. A system according to claim 25 and wherein said visualization functionality comprises:
   receiving a list of hyperlinks;
   splitting a URL of each hyperlink into URL components including at least a path component and a host component;
   trimming a path component based on the consideration of finding the most representative image of a given web page; and
   constructing a new URL including a trimmed path component.

29. A system according to claim 18 and wherein said second functionality comprises fourth functionality employing a web browser which interfaces via the Internet with a web server including visualization functionality.

30. A system according to claim 29 and wherein said visualization functionality is operative to embed commands to the web browser to download, via said image server, thumbnail visual images of web pages which represent hyperlinks contained in the web page and to provide to a user, via the web browser, an annotated web page.

31. A system according to claim 30 and wherein said annotated web page includes the web page having within it thumbnail visual images of homepages of web sites referenced by hyperlinks contained in the web page.

32. A system according to claim 18 and wherein said thumbnail visual image appears hovering over said hyperlink.

33. A system for generating an image server database of thumbnail visual images of web pages, the system comprising:
   a multiplicity of downloaders, each receiving at least one URL from a list of URLs corresponding to said web pages, the thumbnail visual images of which it is desired to supply to said image server database, and simultaneously retrieving from the Internet web pages and embedded objects corresponding to said at least one URL; and
   at least one thumbnail generator operative to render the web pages, shrink said rendered images of the web pages and supply said rendered images to said image server database.

34. A system according to claim 33 and wherein said multiplicity of downloaders are operative to delete executable content from the web pages.

35. A method for presenting Internet information to a user comprising:
   providing to a user a visual image of a web page containing at least one hyperlink; and at least partially concurrently
   providing a thumbnail visual image of another web page of at least one web site which is represented by said at least one hyperlink via the Internet by employing an image server that stores and provides said thumbnail visual image,
   said providing a thumbnail visual image comprising employing a web browser which interfaces via the Internet with a web server, separated from said image server, including visualization functionality, said visualization functionality being operative to embed commands to the web browser to download, via said image server, thumbnail visual images of web pages which represent hyperlinks contained in the web page and to provide to a user, via the web browser, an annotated web page.

36. A method according to claim 35 and wherein said thumbnail visual image is displayed alongside the visual image of said web page.

37. A method according to claim 36 and wherein said thumbnail visual image appears hovering over said hyperlink.

38. A method according to claim 35 and wherein said thumbnail visual image is displayed within the visual image of said web page.

39. A method according to claim 38 and wherein said thumbnail visual image appears hovering over said hyperlink.

40. A method according to claim 35 and wherein a plurality of thumbnail visual images represented by at least one hyperlink are displayed simultaneously along with said visual image of a web page containing at least one hyperlink.

41. A method according to claim 35 and wherein said web page comprises an HTML page.

42. A method according to claim 35 and wherein said annotated web page includes the web page having within it thumbnail visual images of homepages of web sites referenced by hyperlinks contained in the web page.

43. A method according to claim 35 and wherein said visualization functionality comprises:
   generation of a list of hyperlinks from a web page;
   elimination of links which refer back to a web server sending said web page;
   determination of whether redirection links are present and if so, providing thumbnail visual images of ultimate destinations thereof; and
   providing thumbnail visual images of remaining hyperlinks.

44. A method according to claim 35 and wherein said visualization functionality comprises:
   receiving a list of hyperlinks;
   splitting a URL of each hyperlink into URL components including at least a path component and a host component;
   trimming a path component based on the consideration of finding the most representative image of a given web page; and
   constructing a new URL including a trimmed path component.

45. A method according to claim 35 and wherein said thumbnail visual image appears hovering over said hyperlink.

46. A system for presenting Internet information to a user comprising:
   first functionality providing to a user a visual image of a web page containing at least one hyperlink; and
   second functionality operative at least partially concurrently with said first functionality for providing a thumbnail visual image of another web page of at least one web site which is represented by said at least one hyperlink via the Internet by employing an image server that stores and provides said thumbnail visual image, said second functionality comprising third functionality employing a web browser which interfaces via the Internet with a web server, separated from said image server, including visualization functionality,
   said visualization functionality being operative to embed commands to the web browser to download, via said image server, thumbnail visual images of web pages which represent hyperlinks contained in the web page and to provide to a user, via the web browser, an annotated web page.

47. A system according to claim 46 and wherein said thumbnail visual image is displayed alongside the visual image of said web page.

48. A system according to claim 47 and wherein said thumbnail visual image appears hovering over said hyperlink.

49. A system according to claim 46 and wherein said thumbnail visual image is displayed within the visual image of said web page.

50. A system according to claim 49 and wherein said thumbnail visual image appears hovering over said hyperlink.

51. A system according to claim 46 and wherein a plurality of thumbnail visual images represented by at least one hyperlink are displayed simultaneously along with said visual image of a web page containing at least one hyperlink.

52. A system according to claim 46 and wherein said web page comprises an HTML page.

53. A system according to claim 46 and wherein said annotated web page includes the web page having within it thumbnail visual images of homepages of web sites referenced by hyperlinks contained in the web page.

54. A system according to claim 46 and wherein said visualization functionality comprises:
   generation of a list of hyperlinks from a web page;
   elimination of links which refer back to a web server sending said web page;
   determination of whether redirection links are present and if so, providing thumbnail visual images of ultimate destinations thereof; and
   providing thumbnail visual images of remaining hyperlinks.

55. A system according to claim 46 and wherein said visualization functionality comprises:
   receiving a list of hyperlinks;
   splitting a URL of each hyperlink into URL components including at least a path component and a host component;
   trimming a path component based on the consideration of finding the most representative image of a given web page; and
   constructing a new URL including a trimmed path component.

56. A system according to claim 46 and wherein said thumbnail visual image appears hovering over said hyperlink.

* * * * *